UNITED STATES PATENT OFFICE.

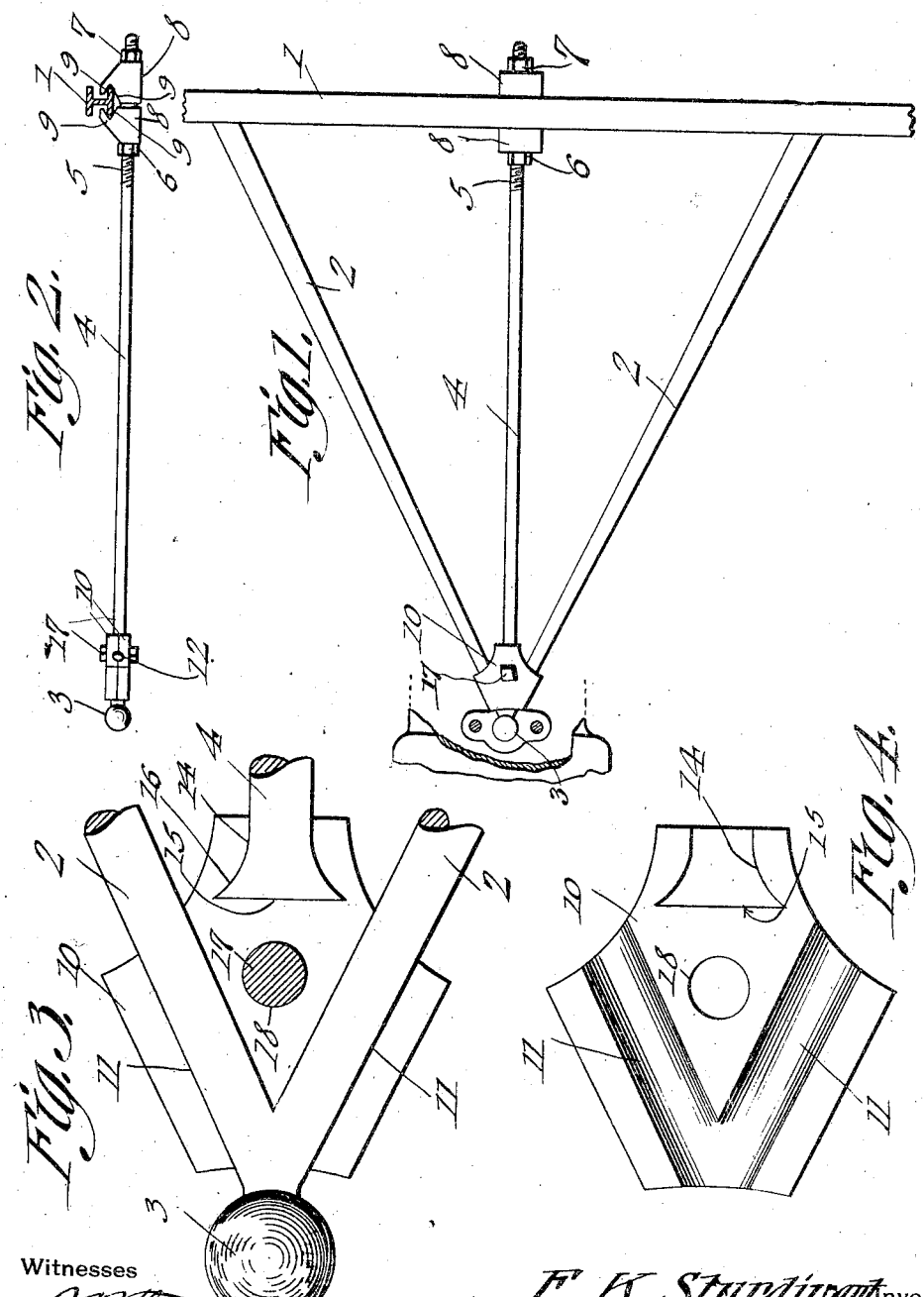

FRANK K. STURDIVANT, OF BISCOE, NORTH CAROLINA, ASSIGNOR OF ONE-HALF TO CHARLES E. KELLAM, OF BISCOE, NORTH CAROLINA.

RADIUS-ROD BRACE FOR AUTOS.

1,300,041.

Specification of Letters Patent.

Patented Apr. 8, 1919.

Application filed December 2, 1914. Serial No. 875,174.

*To all whom it may concern:*

Be it known that I, FRANK K. STURDIVANT, a citizen of the United States, residing at Biscoe, in the county of Montgomery and State of North Carolina, have invented a new and useful Radius-Rod Brace for Autos, of which the following is a specification.

The device forming the subject matter of this application is a brace adapted to be employed in connection with the radius rods of a vehicle, and particularly, to be employed in connection with the radius rods which extend rearwardly from the forward axle of a Ford automobile.

The invention aims to provide a radius rod brace which will reinforce the radius rods adjacent their connected rear ends, novel means being provided for assembling the rear end of the brace with the radius rod, and novel means being provided for assembling the forward end of the brace with the axle from which the radius rods project.

The invention aims to provide means whereby the radius rod may be adjusted, longitudinally, from a point in front of the axle.

A further object of the invention is to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—

Figure 1 shows in top plan, an axle and radius rods wherewith the device forming the subject matter of this application has been assembled;

Fig. 2 is a side elevation of the radius rod brace, the axle of the vehicle being shown assembled with the brace;

Fig. 3 is a top plan showing the coöperation between the rear end of the brace and the rear ends of the radius rods, one of the clamping elements which engage the rear ends of the radius rods being removed;

Fig. 4 is a top plan of one of the clamping elements which connect the rear end of the brace with the rear ends of the radius rods.

In the drawings the numeral 1 indicates the forward axle of the vehicle, the axle 1 ordinarily being in the form of an I-beam as shown. The radius rods are shown at 2. The forward ends of the radius rods are united with the axle 1 in any suitable manner, the rods 2 converging as they extend rearwardly and ultimately merging into a ball 3, as is common and well understood in the art.

In carrying out the invention there is provided a connecting element preferably in the form of an auxiliary rod 4. The rod 4 lies between the radius rods 2 and substantially bisects the angle defined by the rods 2. At its forward end, the auxiliary rod 4 is threaded as shown at 5 to receive nuts 6 and 7. Mounted on the rod 4 between the nuts 6 and 7, but not threaded onto the rod are coöperating clamps 8. In their inner edges, the clamps 8 are equipped with converging walls 9 defining V-shaped notches.

The rear end of the auxiliary rod 4 carries a head adapted to engage the radius rods 2 near to the ball 3. The head preferably is in the form of a clamp comprising parts 10, the inner faces of which are equipped with rearwardly converging grooves or seats 11, defining, as clearly indicated in Fig. 2, openings 12 through which the radius rods 2 pass. Adjacent their forward ends, the constituent parts 10 of the rear clamp are provided with longitudinal grooves 14 having flared enlargements 15. The rear end of the auxiliary rod 4 passes into the opening defined by the mating grooves 14 in the parts 10 of the clamp and is equipped terminally with a flared enlargement 16 received in the coöperating enlargements 15 of the grooves 14. The enlargement 16 at the rear end of the rod 4 preferably, although not necessarily, is of circular outline, the groove elements 15 being shaped accordingly. The parts 10 of the rear clamp are provided with coöperating openings 18 adapted to receive a securing device such as a bolt and nut 17.

In practical operation, the rear end of the rod 4 is assembled with the clamp parts 10 in a manner which will be obvious from Figs. 3 and 4, taken with the foregoing description. The clamp parts 10 and 10' are placed respectively above and below the rear ends of the radius rods 2, and the bolt 17 is mounted in place in the openings 18 and is tightened up, to hold the clamp parts 10 together. The head or enlargement 16 on the rear end of the rod 4 ordinarily is bound between the clamp parts 10 and does not rotate.

The jaws or clamp elements 8 are assembled with the lower flange of the axle, as shown in Fig. 2, and the nuts 6 and 7 are tightened up, thus binding the jaws 8 firmly on the axle 1. Owing to the fact that the lower flange of the axle 1 is received in the V-shaped notches defined by the walls 9, a vertical movement of the jaws 8 and the rod 4 is not possible, it being unnecessary to shape the axle-gripping portions of the jaws 8 so as to conform exactly to the flange of the axle 1. In other words, the jaws 8 will conform readily to the flange of axles of different sizes and will be held firmly thereon.

It is to be observed that the rod 4 may be moved longitudinally, by the manipulation of the nuts 6 and 7; thus, the rear head embodying the clamp parts 10 may be pulled forwardly so that the rear portions of the radius rods 2 will be bound firmly in the converging seats or grooves 11. It is to be observed that the adjustment of the rod 4 takes place adjacent the axle 1 and that the operator in carrying out this adjustment is not compelled to crawl beneath the vehicle or assume a dangerous and inconvenient position.

Having thus described the invention, what is claimed is:—

In a motor vehicle, rearwardly converging radius rods, having their rear ends connected with each other and terminating in a ball; an axle wherewith the forward ends of the radius rods are connected; a lower clamp disposed below the radius rods adjacent their rear ends and in front of the ball; an upper clamp disposed above the radius rods adjacent their rear ends and in front of the ball, both of the clamps being provided upon their inner faces with rearwardly converging grooves which receive the radius rods, both of the clamps being provided on their inner faces and at their forward edges with longitudinal grooves terminating at their rear ends in coöperating enlargements defining a recess; a securing device connecting the clamps together detachably and located between the radius rods; a single auxiliary rod bisecting the angle defined by the radius rods, the rear end of the single auxiliary rod being received in the longitudinal grooves of the clamps and terminating in an enlargement received in the recess; coöperating jaws mounted on the forward end of the auxiliary rod for adjustment longitudinally of said rod, the jaws engaging the axle; and means carried by the auxiliary rod and engaging the jaws to hold the same in adjusted positions.

In testimony that I claim the foregoing as my own I have hereto affixed my signature in the presence of two witnesses.

FRANK K. STURDIVANT.

Witnesses:
J. R. MILLER,
B. H. FISHEL.